Figure 1:
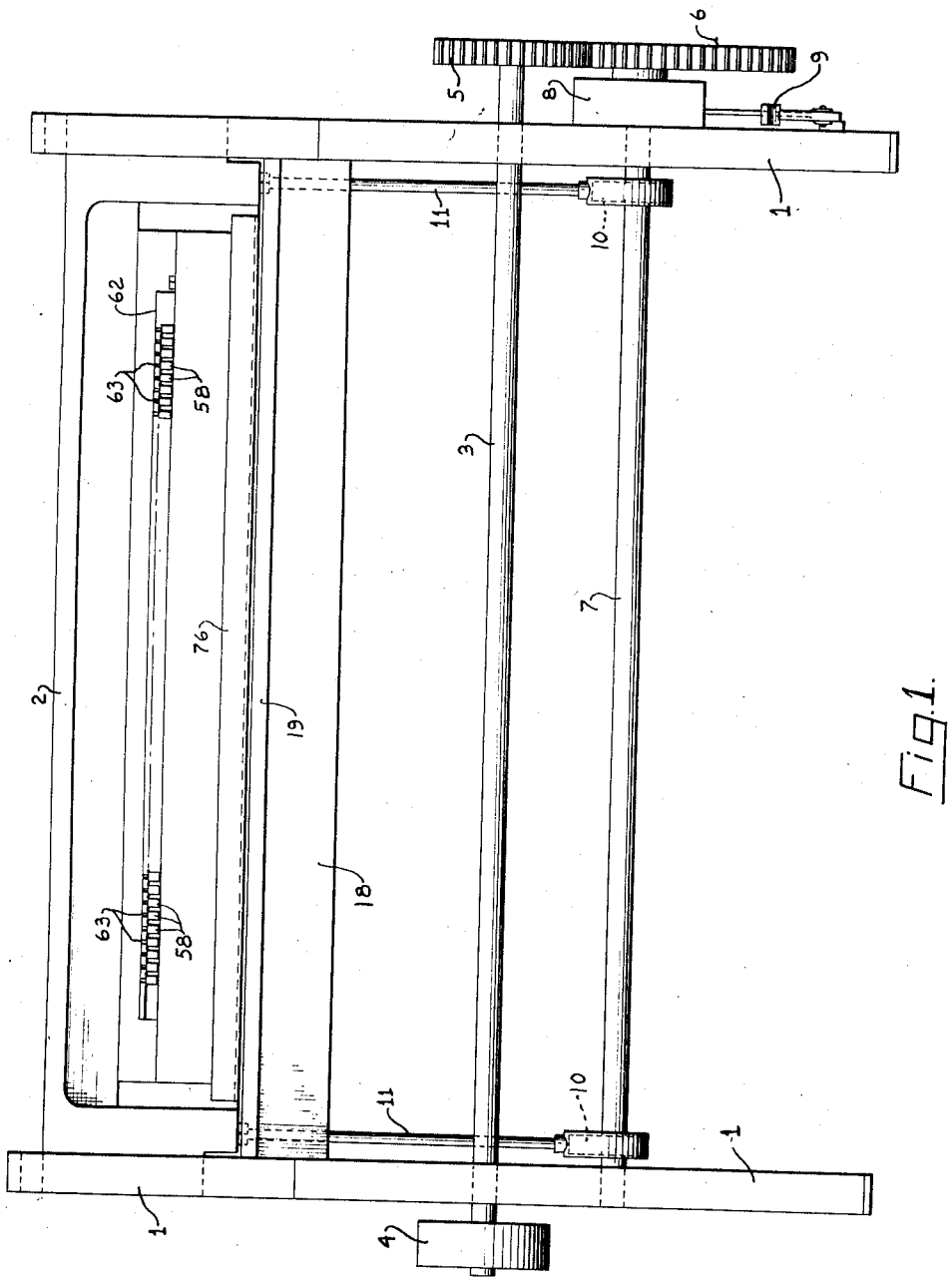

June 11, 1940.  W. B. DUNLAP  2,204,405
PUNCHING MACHINE
Filed April 23, 1938   5 Sheets-Sheet 1

INVENTOR
Wilbur B. Dunlap
BY
ATTORNEY

June 11, 1940.  W. B. DUNLAP  2,204,405
PUNCHING MACHINE
Filed April 23, 1938   5 Sheets-Sheet 2

INVENTOR
Wilbur B. Dunlap
BY
ATTORNEY

June 11, 1940. W. B. DUNLAP 2,204,405
PUNCHING MACHINE
Filed April 23, 1938 5 Sheets-Sheet 3

INVENTOR
Wilbur B. Dunlap
BY
Stuart Freeman
ATTORNEY

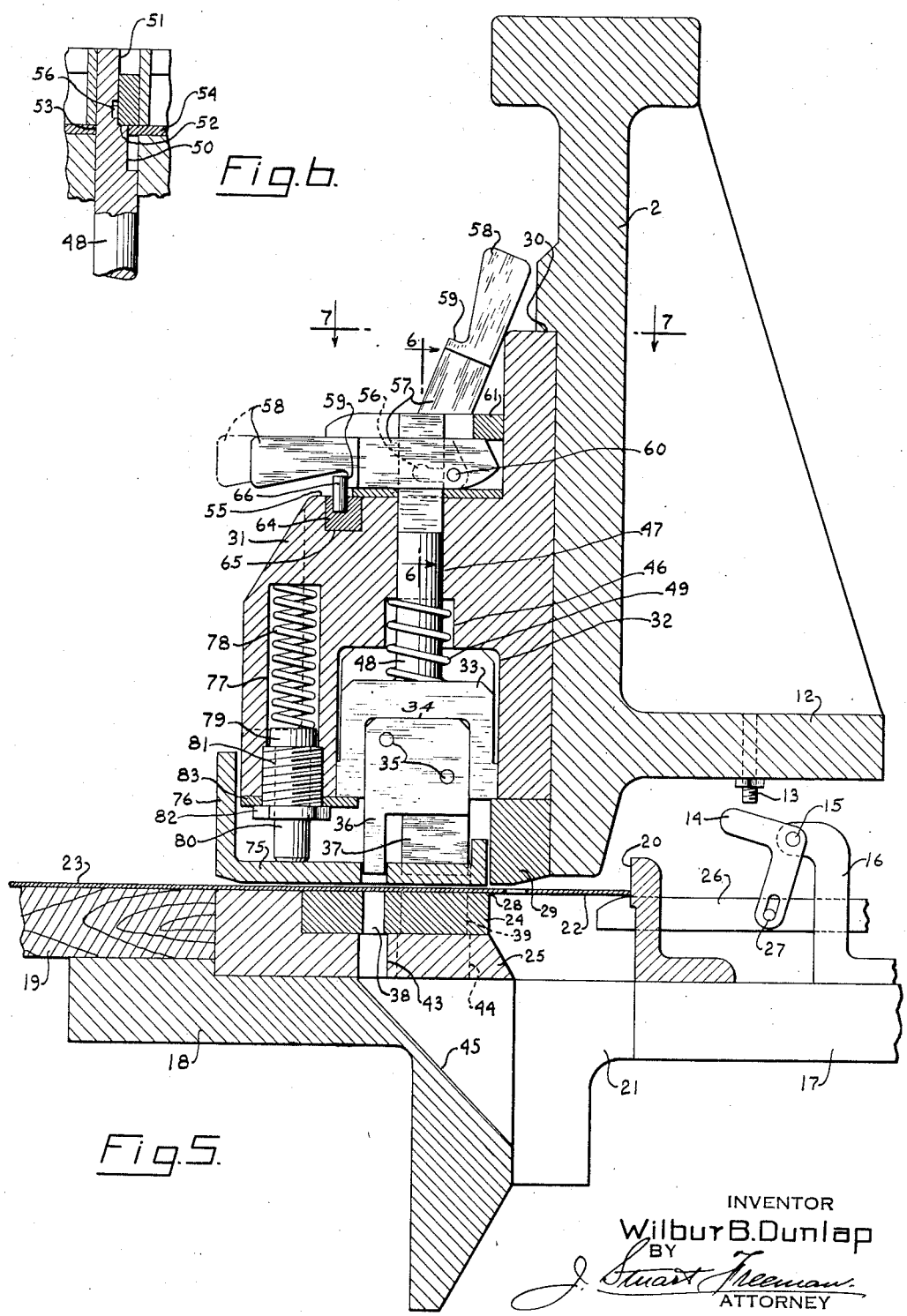

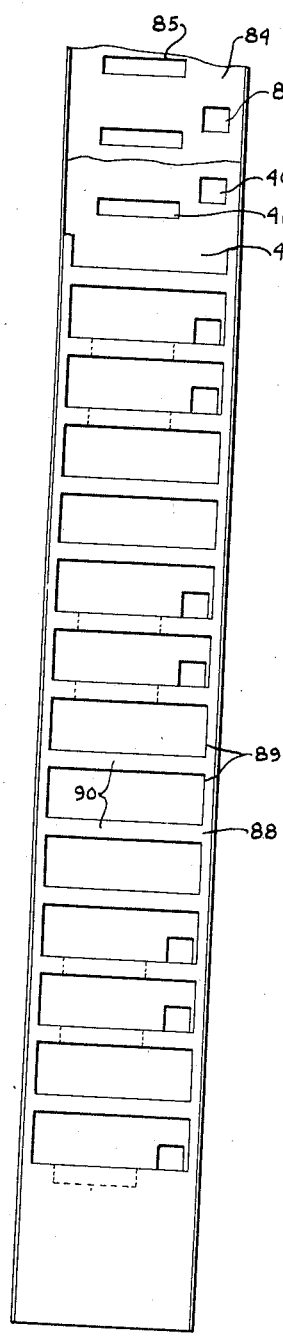 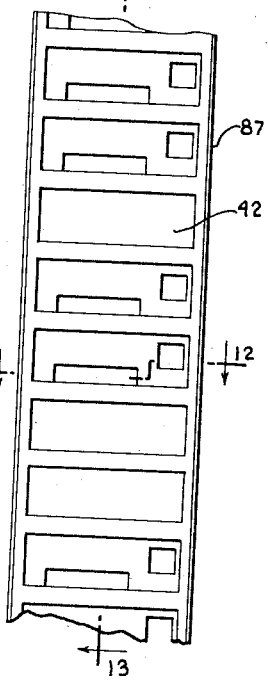 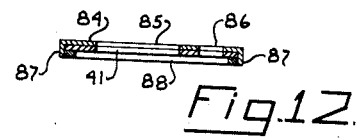 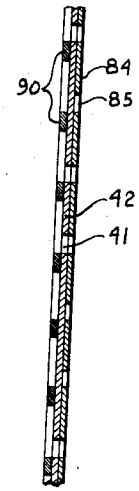 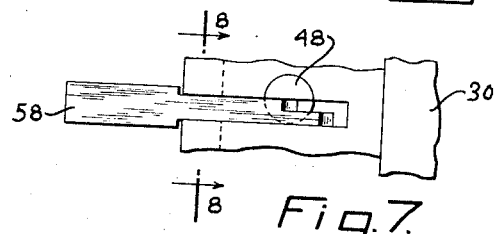 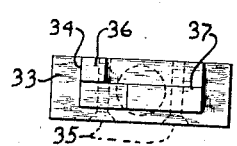 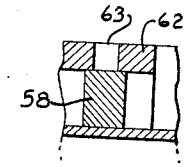

Patented June 11, 1940

2,204,405

UNITED STATES PATENT OFFICE 2,204,405

PUNCHING MACHINE

Wilbur B. Dunlap, Philadelphia, Pa., assignor to Dunlap Printing Company, Philadelphia, Pa., a corporation of Pennsylvania Application April 23, 1938, Serial No. 203,778

13 Claims. (Cl. 164—86)

The object of the invention is to provide improvements in punching machines broadly, but more especially in a machine which is adapted for punching from cardboard strips the windows through which various indicating means in voting or tabulating machines are visible.

In voting machines generally, and particularly with respect to the so-called Shoup machine, there are either rows or columns for the candidates of the different political parties, though it is to be understood that the invention is by no means limited to use only upon such type of machines. However, for purposes of illustration, in machines of this character there are regions available for the names, the respective individual vote-indicating means and the totals of each of the several candidates in each such party or group. Seldom if ever are all of these name places used in any one primary or final election, principally due to the fact that more than the usual number of offices or vacancies are provided for, while generally the incumbents of some of the offices hold over, so that there is more often than not no occasion to vote for persons to fill certain offices, and some of the vote-indicating regions are, therefore, left inactive or vacant. Consequently, those office or name positions which do not have to be voted for are shielded, while those which are to be voted for must be made visible. For this purpose a strip of preferably light-weight cardboard is used for each so-called party column (or row depending upon the type of machine), and from this strip are punched out so-called windows, in properly related pairs to make visible respectively the total of each candidate at any given time and whether or not the particular candidate has been "voted" by the voter, who is operating the voting machine, by his having properly shifted the individual lever corresponding to such candidate. These pairs of windows may be arranged in any number within the capacity of the machine and in any relation to one another selectively, whether they are consecutive or have blank spaces between them. Also, it is to be understood that the machine may be used for punching strips, cards, sheets or webs for other purposes than that herein described, and instead of there being pairs of windows in each case, the windows may be but single or of any desired number, depending upon the number and arrangement of the parts of the voting machine which it is necessary to expose.

Another object, therefore, is to provide a punching machine of such construction and operation, that with a given maximum number of die units any desired number and arrangement of said units can be provided selectively, after which either pre-cut cards, sheets or webs can be fed into the machine, and series of windows cut from them in accordance with any desired shape and arrangement of the said dies, in the case of a sheet or web the previously punched section being severed from the remainder preferably by and upon the same movement of the machine, during which a subsequent set of windows is cut in an adjacent area.

Still another object is to provide a machine of this character in which a female die plate is provided, having any desired number of aperture units, and a male die head having a corresponding number of die units, together with means to shift any one or more, or even all, of said male dies into operating relation with respect to said female die plate, means to lock said shifted male dies in operative position, and means to reciprocate either the male or female dies with respect to each other, and preferably in association with a shearing knife so arranged that the section of card, sheet or web previously punched is adapted to be severed from the adjacent portion being punched during the same operation as that of the shearing.

Figure 2:
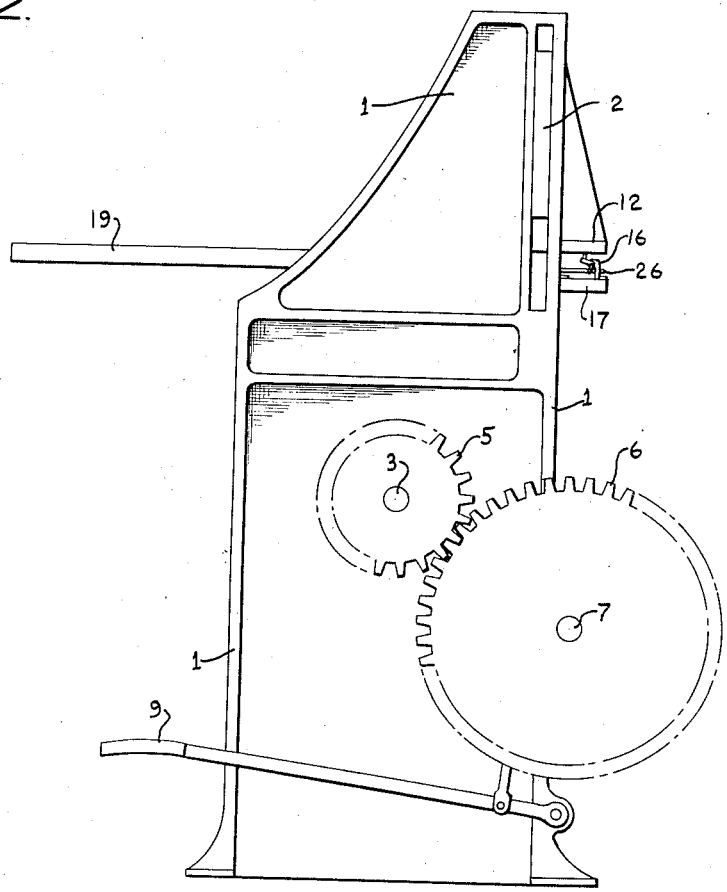
Figure 3:
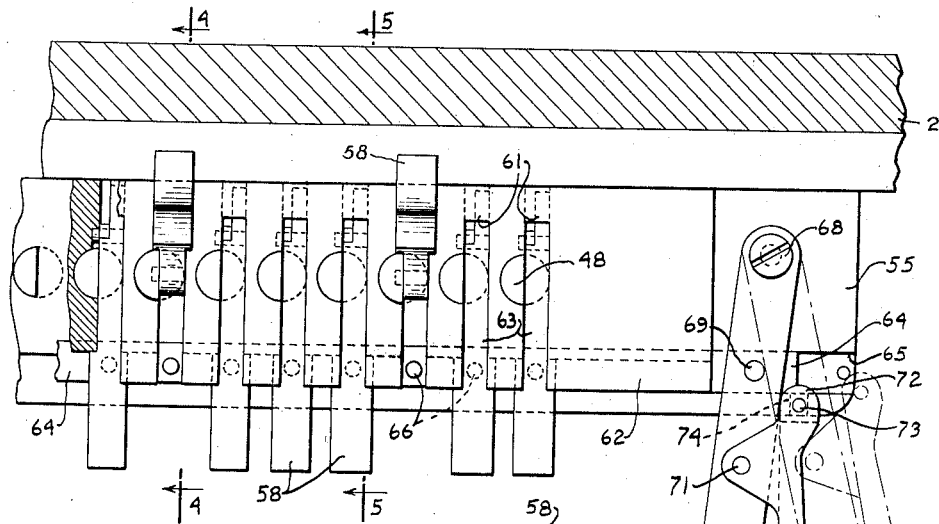
Figure 4:
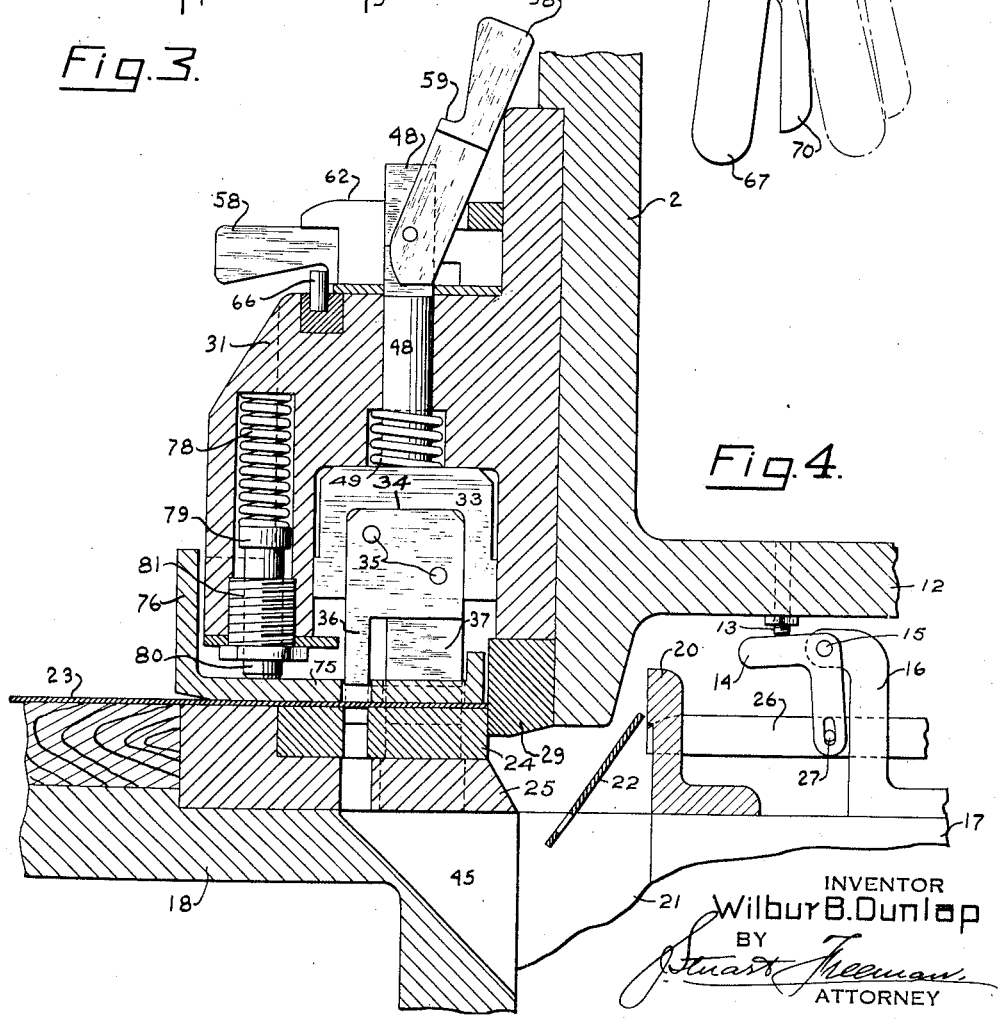

In addition to the objects thus very broadly stated, the invention comprises further details of construction and operation, which are hereinafter fully brought out in the following description, when read in conjunction with the accompanying drawings, in which Fig. 1 is a front elevation of the machine comprising one embodiment of the invention; Fig. 2 is a side elevation of the same; Fig. 3 is an enlarged fragmentary top plan view of a portion of the die head and the dies and locking means carried thereby; Fig. 4 is a transverse section on the line 4—4 of Fig. 3; Fig. 5 is a similar section on the line 5—5 of Fig. 3; Fig. 6 is a vertical section on the line 6—6 of Fig. 5; Fig. 7 is a fragmentary top plan view of one of the die-shifting levers and associated parts, taken on the line 7—7 of Fig. 5; Fig. 8 is a section on the line 8—8 of Fig. 7; Fig. 9 is a fragmentary bottom plan view of one of the male die units and its carrier head; Fig. 10 is an elevational view of a portion of one of the frames of a voting machine partially broken away to show one of the windowed strips of cardboard, or the like, supported by and within said frame; Fig. 11 is a view of said frame and the strip supported thereby, but with the front portion of said frame shifted into a lower position to make visible one of the windows of each of the pairs with which the said strip is provided; Fig. 12 is a horizontal section on the line 12—12 of Fig. 11; Fig. 13 is a vertical section on the line 13—13 of Fig. 11.

It will be understood initially by those skilled in the art, that a machine designed for the purpose herein set forth, may assume any one of probably an infinite number of constructions, but for purposes of illustration is here shown as comprising two end supporting frames 1, rigidly connected together at the top at their upper portions by a vertically movable die head 2 of rigid construction, and any other connecting braces which may be necessary to maintain absolute rigidity between the end frames. For convenience said end frames are shown as jointly supporting a rotatable drive shaft 3, carrying a pulley 4 representing any desired type of power mechanism, and also a gear 5 which meshes with a larger gear 6, which latter is adapted to idle upon a shaft 7, supported by and extending between said end frames. Said last-mentioned shaft is provided with any suitable type of clutch mechanism 8, which by means of either or both a pedal 9, or manually operated element, said last-named gear is fixed to rotate the shaft upon which it is mounted. This last shaft 7 also carries preferably two or more eccentric elements 10 which, in well known manner, oscillate thrust rods 11, which in turn are connected to and operate to reciprocate the die head 2 for the purposes hereinafter described.

Referring to Figs. 3, 4, 5, 6, 7, and 8, the die head 2 is shown as being provided with a rearwardly extending offset 12 carrying a longitudinally adjustable stud 13 for engagement during the downward motion of said head with a rocker arm 14 pivotally carried at 15 by a bracket 16 supported by a rearwardly extending portion 17 of a casting which also extends forwardly at 18 and unites with the end frame members 1 in supporting a forwardly extending work table 19. The rear portion 17 of said casting, or the like, is provided with an upwardly extending stop 20, positioned above and immediately adjacent to the rear of a transversely extending elongated discharge aperture 21, through which the rearmost and previously punched portion 22 of a card, sheet, or web 23 drops after having been severed from the remainder of such card, sheet or web, as hereinafter described. The upper portion of the casting or the like 17—18, is provided with a female die plate 24, which rests upon and is operatively supported rigidly by a suitable holder 25, said plate and holder being positioned immediately forward of the discharge aperture 21 and with their upper surfaces flush with the corresponding surface of the work table 19, so that the sheet of cardboard, or the like 23, can pass freely from said table across the holder 25 and die plate 24 until it contacts the stop 20, the rearmost portion of such sheet, or the like, adjacent to said stop being temporarily supported by a reciprocatory rest 26, which is shifted rearwardly from the position shown in Fig. 5 into the position shown in Fig. 4 by a depending portion 27 of the rocker arm 14 during each downward movement of the die head 2.

It will be noted from Figs. 4 and 5, that the rearmost portion of the female die plate 24 provides a cutting or shearing edge 28, past and in cooperation with which is a cutter bar 29, carried by the lowermost edge portion of the die head 2, so that upon the downward motion of said head, the rearmost portion 22 of the sheet or the like 23, is severed, as indicated in Fig. 4, and permitted to freely drop through the aperture 21 upon the removal of the rest 26 rearwardly, as hereinbefore described.

The head 2 is provided with a longitudinally extending shoulder 30, beneath and against which is fixedly secured a block 31, which extends downwardly to a point immediately above the cutter bar 29, and is provided in its lower face with a recess 32 of rectangular cross section for the reception of a series of die carriers 33, each of which is adapted to reciprocate in a fixed path within said recess and is in turn provided with a laterally directed recess 34, in which is secured by any suitable means 35 the one or more male dies which correspond with the apertures in the die plate 24. In this case two separate dies 36 and 37 are secured within the carrier recess 34, which cooperate with corresponding recesses 38 and 39 in the die plate 24, for the purpose of punching the square and oblong windows 40 and 41, respectively, in a strip 42 of cardboard or the like, shown in Figs. 10, 11, 12 and 13, which strip is the same as the strip 22, shown in Figs. 4 and 5.

It should be noted at this point, that the die holder 25 is provided with apertures 43 and 44 in alignment with but somewhat larger than the corresponding apertures in the die plate 24, so as to permit the uninterrupted discharge from said die plate of the waste particles punched from the sheet 23, whence such waste particles preferably fall upon and are directed rearwardly by a diagonally extending surface 45, with which the casting or the like 17—18 is provided.

Returning to the block 31, the same is provided, above each of the male die carriers 33, with recesses 46, from which extend upwardly bores 47, through each of said bores there extending a preferably cylindrical die shaft 48, which shafts are integral with the several die carriers 33 and about which shafts are positioned coil springs 49, the lower end of which presses against the head of said die carrier, while the upper end extends into and is operatively positioned by the innermost and side walls of the corresponding recesses 46. The uppermost portion of each of the die shafts 48 is stepped so as to provide first a lower laterally directed flat surface 50, above which is a second laterally directed surface 51, these said surfaces being separated by an abrupt shoulder 52. That portion of each of these shafts throughout the length of the first-mentioned flat surface 50 passes slidably through a similarly shaped aperture 53 in a plate 54, which is secured to and upon the upper portion of a shelf 55, with which the block 31 is provided, while the uppermost flat surface 51 in each case is provided with a laterally, inwardly extending slot 56, shaped substantially as that shown in Figs. 5 and 6.

For each die shaft 48, there is a corresponding oscillatable lever 57, provided with a manually engageable free end portion 58, and with an outwardly directed shoulder 59. The said manually engageable portion 58 is transversely wider (see Figs. 3 and 7) than the rearmost portion of such lever, while said last named portion of said lever is provided in each case with a laterally projecting pin 60, which is adapted to enter the recess 56 in the die shaft 48 in each instance. By referring to Figs. 3, 4, 5 and 7, it will be seen that when the shaft 57 is oscillated into its uppermost position (Fig. 4) its rear end rides upon the upper surface of the plate 54 and its pin 60 lifts the die shaft 48 against the tension of the spring 49, thereby maintaining the dies 36 and 37 and their carrier 33 in retracted uppermost or inoperative position. However, upon shifting the lever 57 into its lowermost or horizontally extending dot-and-dash position (Fig. 5), the spring is permitted to thereupon force the die carrier and attached shaft into their lowermost or operative position. The lever is thereupon shifted longitudinally rearwardly, so that its rear end engages beneath an overhanging portion 61 of a plate 62, which extends longitudinally of and is fixedly carried by the block 31. This plate is provided with a series of transversely extending recesses 63 (Fig. 3), which are narrower than the width of the manually engageable portion 58 of the respective levers 57, so that as one of said levers is shifted rearwardly, its manually engageable portion is likewise shifted beneath those portions of the plate 62 upon the opposite sides of the forward portion of the corresponding recess 63 (Fig. 3), so that said lever is positively prevented from being oscillated upwardly into its initial inoperative position. Furthermore, in this lower position, said lever directly engages the shoulder 52 to prevent the corresponding shaft and die carrier with its male dies from being retracted upwardly, when such is not intended.

Furthermore, to insure against the accidental shifting of any one or more of said levers outwardly, so as to thereby permit the upward release of the corresponding die shafts, a locking means is provided in the form of a preferably rectangular bar 64, which is reciprocatably positioned in a correspondingly shaped groove or recess 65 in the upwardly directed shelf surface 55 of the block 31, said bar being provided with upwardly extending pins 66, which are adapted to move into a position directly in front of and closely adjacent to the shoulder 59 of any lever which has been depressed into operative position. The bar 64 may be shifted in any desired manner, but is here shown as being actuated by means of a manually engageable lever 67, which is pivotally secured at 68 to one end portion of the shelf surface 55 and is provided with a pivot pin 69, which extends into a recess within or otherwise suitably engages said bar, which bar may in turn be locked against accidental release in either direction by means of a hand grip 70 pivotally secured at 71 to the lever 67, and in turn provided upon a freely extending end portion 72 with a preferably depending pin 73, adapted in one position to engage within a recess 74 in a portion of the shelf surface 55, adjacent to the groove or recess 65 (Fig. 3), to prevent the bar 64 from being shifted toward the right, as shown in Fig. 3, to thereby remove the respective pins 66 from operative position in front of the lever shoulders 59.

As auxiliary to the more essential particulars and functions of the improved punching machine, means is provided to press downwardly upon and secure the sheet or the like 23 in fixed stationary position, while the punching and shearing operations take place. This means primarily comprises a flat plate 75, positioned beneath and in spaced relation with the lowermost surface 70 of the block 31, and preferably terminating forwardly in an upwardly extending flange 76 to substantially enclose the space between said plate and block and prevent the sheet 23 from accidentally entering said space as it is initially fed rearwardly between the two sets of male and female dies, the opposite end portions of said plate 75 being carried by and yieldingly positioned with respect to said block 31, so as to permit said plate to yield upwardly from the position shown in Fig. 5 towards the position shown in Fig. 4, as said block is depressed and the initial downward movement of said plate with said block is arrested by engagement with the sheet 23, as the latter rests upon the die holder 25. The under surface of the block 31 is provided with a plurality of upwardly extending bores 77 in the upper portions of which are positioned compression springs 78, the lower portions of which springs press against the enlarged heads 79 of pins 80, which extend slidably through and are prevented from accidental loss from said bores by means of axially bored plugs 81 extending well into said bores, the heads 82 of said plugs also operating to secure in fixed position either a single plate or separate plates 83, which extend rearwardly into the path of and serve as stops (see Figs. 4 and 5) for the downward movement of the forward portions of the several die carriers 33, the opposite or rearward portions of said die carriers being simultaneously arrested in their downward movement by engagement with the freely forwardly projecting upper portion of the cutter bar 29 (Fig. 5).

As hereinbefore stated, the broad principle involved in the construction and operation of this improved punching machine is adapted for the punching of apertures or windows in cards, sheets or webs of many different kinds and when used for punching windows in cards to be used in voting machines, the shape and arrangement of such windows may be of varied nature, depending upon the requirements of a particular type of voting machine, wherefore it is to be understood that the card holder herein described is offered merely for purposes of illustrating a commercial use for the windowed cards. With this in mind, a holder is shown as comprising a strip 84, having oblong windows 85 and square windows 86, corresponding in position with the pairs of windows 41 and 40 of the card 42, which is positioned upon said strip and prevented from lateral movement with respect thereto by engagement with oppositely positioned forwardly extending flanges 87, said card being securely retained within such flanged strip 84 by means of a second strip 88, which is also positioned between the flanges 87, is provided with enlarged spaced windows 89 and is adapted to reciprocate with respect to said first-mentioned strip and said card. To illustrate, said first and second strips and an intervening card are initially assembled, as shown in Fig. 10, with the card windows 41 and 40 in registry with the respective rear strip apertures 85 and 86, and with the smaller aligned windows 40 and 86 being visible through the apertures 89 in the frontal strip 88, while the larger aligned apertures 41 and 85 are shielded by and to the rear of intervening portions 90 of said frontal strip, which separate its windows 89 from one another.

In the particular type of voting machine to which the windowed card is here shown as being adapted, it is to be understood that through the larger aligned apertures 41 and 85 are visible the totals up to a given time of the votes cast for such candidate, whose name appears on the space on said card immediately above one of the apertures 41, but which aperture and total otherwise visible thereto is screened or shielded during the regular operation of the voting machine by the intervening portions 90 of the frontal strip 88, while, however, an indicating sign or signal is visible through the corresponding smaller aligned apertures 40 and 86 upon the voter's moving the corresponding lever or other part of the voting machine by which the registration or recording of his vote for a particular candidate is effected. Finally, when the voting has ceased and it is desired to read the totals for the various candidates, the frontal strip 83 is shifted downwardly to the position shown in Fig. 11, thereby exposing the totals visible through the larger aligned apertures 41 and 85 of the name-bearing card 42 and rear strip 84.

In the operation of this device, the proper levers 57 are manually shifted forwardly and downwardly and thence rearwardly, and finally locked in operative position, as hereinbefore described, whereupon a sheet of cardboard or the like is inserted beneath the plate 75 and between the sets of dies. Actuation of the pedal 9 causes the die head 2 to descend and punch out the windows in accordance with the number, shape and arrangement of the dies selected, as hereinbefore described. After the sheet is initially slid rearwardly until it contacts with the stop 20, the first downward movement of the head 2 will sever an unpunched strip, which may be considered as waste. However, after the initial punching of each such sheet, the latter is slid rearwardly as the head 2 rises to its initial inoperative position and until the punched portion of the sheet reaches said stop. Thereafter each subsequent movement of the head 2 simultaneously severs the rearwardly extending, previously punched portion of the sheet shown dropping in Fig. 4, and also punches the next succeeding portion of such sheet, as hereinbefore described.

Having thus described my invention, what I claim as new and desire to protect by Letters Patent of the United States is:

1. A punching machine, comprising a relatively fixed multiple-die plate, a relatively movable die head, a series of dies carried by said head and corresponding with the dies of said plate, a shouldered extension carried by each of the dies on said head, and transversely reciprocatory means to selectively engage the shoulders of said extensions and shift into and upon being angularly shifted maintain one or more of the dies upon said head in inoperative position.

2. A punching machine, comprising a relatively fixed multiple-die plate, a relatively movable die head, a series of dies carried by said head and corresponding with the dies of said plate, a shouldered extension carried by each of the dies on said head, a lever for each of the dies carried by said head, said levers in one position being engageable with the shoulders of their corresponding die extensions to shift them into inoperative position selectively, and in a second position said levers being operative to secure their corresponding dies in operative position.

3. A punching machine, comprising a relatively fixed multiple-die plate, a relatively movable die head, a series of dies carried by said head and corresponding with the dies of said plate, a shouldered extension carried by each of the dies on said head, means to selectively engage the shoulders of said extensions and shift into and maintain one or more of the dies upon said head in inoperative position, and locking means to secure the remaining dies in operative position.

4. A punching machine, comprising a relatively fixed multiple-die plate, a relatively movable die head, a series of dies carried by said head and corresponding with the dies of said plate, a shouldered extension carried by each of the dies on said head, a lever for each of the dies carried by said head, said levers in one position being engageable with the shoulders of their corresponding die extensions to shift them into inoperative position selectively, and in a second position said levers being operative to secure their corresponding dies in operative position, and locking means to secure the levers of operative dies in said second position.

5. In a punching machine, the combination of a die head, a series of dies movably carried thereby, and manually actuated means reciprocatable transversely and oscillatable in the planes of the axes of said dies, in one position being operative to maintain said dies selectively in retracted position and in another position being operative to fixedly secure said dies in extended operative position.

6. In a punching machine, the combination of a die head, a series of dies movably carried thereby, manually actuated means reciprocatable transversely and oscillatable in the planes of the axes of said dies, in one position being operative to maintain said dies selectively in retracted position and in another position being operative to fixedly secure said dies in extended operative position, and locking means to simultaneously secure said first means so as to prevent selected dies from shifting from their operative positions.

7. In a punching machine, the combination of a die head, a series of dies movably carried thereby, resilient means tending to maintain said dies in extended operative position, and manually actuatable means operative to retract said dies selectively against the tension of said resilient means, and in another position being operative to permit selected dies to project into operative position, and thereafter to secure said dies against accidental retraction.

8. In a punching machine, the combination of a die head, a series of dies movably carried thereby, resilient means tending to maintain said dies in extended operative position, manually actuatable means operative to retract said dies selectively against the tension of said resilient means, and in another position being operative to permit selected dies to project into operative position, and thereafter to secure said dies against accidental retraction, and locking means to secure said manually actuatable means in said die-securing position.

9. In a punching machine, the combination of a die head, a series of dies carried thereby and movable with respect thereto, resilient means tending to maintain said dies in extended operative position, and manually actuatable levers operative to retract said dies against the tension of said resilient means, or to release said dies selectively so that they project in operative position, said levers when in lowered position and shifted in one longitudinal direction being operative to prevent the projecting dies from receding.

10. In a punching machine, the combination of a die head, a series of dies carried thereby and movable with respect thereto, resilient means tending to maintain said dies in extended operative position, manually actuatable levers operative to retract said dies against the tension of said resilient means, or to release said dies selectively so that they project in operative position, said levers when in lowered position and shifted in one longitudinal direction being operative to prevent the projecting dies from receding, and locking means engageable with said levers to maintain them in shifted die-securing position.

11. In a punching machine, the combination of a die head, a series of dies carried thereby and movable with respect thereto, and a manually actuatable lever for each die operative when in one angular position to shift the die into inoperative position, and in another angular position being operative to release the die so as to function in an operative position, said lever upon being shifted longitudinally in one direction while in the second angular position being operative to secure the die against release from said operative position.

12. In a punching machine, the combination of a die head, a series of dies carried thereby and movable with respect thereto, a manually actuatable lever for each die operative when in operative position, and in another angular position being operative to release the die so as to one angular position to shift the die into infunction in an operative position, said lever upon being shifted longitudinally in one direction while in the second angular position being operative to secure the die against release from said operative position, and locking means operative in one position to prevent said lever from shifting longitudinally in the opposite direction, to thereby permit said lever to be moved in the reverse angular direction, to release said die from operative position.

13. A punching machine, comprising a relatively fixed multiple-die plate, a relatively movable die head, a series of dies carried by said head, a corresponding series of dies carried by said plate, an extension carried by each of the dies of one of said series, and reciprocatory means to selectively engage said extensions and maintain one or more of the dies in that series in operative position.

WILBUR B. DUNLAP.